US007499484B2

(12) United States Patent
Mehrabani et al.

(10) Patent No.: US 7,499,484 B2
(45) Date of Patent: Mar. 3, 2009

(54) METHOD FOR 2D ANTENNA RAKE COMBINING IN A CODE DIVISION MULTIPLE ACCESS SYSTEM

(75) Inventors: Alireza Tarighat Mehrabani, Los Angeles, CA (US); Aliazam Abbasfar, Los Angeles, CA (US)

(73) Assignee: Sasken Communication Technologies Ltd., Bangalore (IN)

( * ) Notice: Subject to any disclaimer, the term of this patent is extended or adjusted under 35 U.S.C. 154(b) by 0 days.

(21) Appl. No.: 11/650,842

(22) Filed: Jan. 8, 2007

(65) Prior Publication Data
US 2007/0177658 A1   Aug. 2, 2007

Related U.S. Application Data

(63) Continuation of application No. 09/951,350, filed on Sep. 10, 2001, now Pat. No. 7,161,974.

(51) Int. Cl.
*H04K 1/00* (2006.01)

(52) U.S. Cl. .......................... 375/148; 375/147
(58) Field of Classification Search ................ 375/147, 375/148, 231, 232, 233; 455/500, 502, 526
See application file for complete search history.

(56) References Cited

U.S. PATENT DOCUMENTS 5,506,861 A * 4/1996 Bottomley .................. 370/441
7,161,974 B2 * 1/2007 Mehrabani et al. .......... 375/148

FOREIGN PATENT DOCUMENTS

EP   0 999 652 A1   5/2000
EP   0 999 652 A1 * 10/2000

OTHER PUBLICATIONS

Tarighat et al., Performance Analysis of Different Algorithms for cdma2000 Antenna Array System and a New Multi User Beamforming (MUB) Algorithm, Sep. 23-28, 2000, Wireless Communications and Networking Conference, vol. 1, pp. 409-414.*
Examination Report issued in connection with European Patent Application No. 02798174.5-2415, Ref. P038419EP, dated Feb. 12, 2007, (7 pages).
Tarighat A. et al.: "Performance Analysis of Different Algorithms for cdma2000 Antenna Array System and a New Multi User Beamforming (MUB) Algorithm" 2000 IEEE Wireless Communications and Networking Conference Chicago, vol. 1, Sep. 23, 2000-Sep. 28, 2000 pp. 409-414, XPO10532534.
International Search Report, Application No. PCT/US02/28630, International filing date Sep. 9, 2002, for Applicant: Innovics Wireless, Inc., (21 pages).

* cited by examiner

*Primary Examiner*—Mohammad H Ghayour
*Assistant Examiner*—Lawrence B Williams
(74) *Attorney, Agent, or Firm*—Husch Blackwell Sanders LLP Welsh & Katz

(57) ABSTRACT

One aspect of the present invention is a method for combining a direct sequence spread spectrum signal comprising signal components that each may be characterized with a space variable and a time variable comprising the steps of: despreading said signal components; and determining a set of combining coefficients from said signal components using a Minimum Mean Square Error combining method that considers said space and time variables of the signal components in parallel. The Minimum Mean Square Error combining methods may utilize iterative methods such as the Least Mean Squares method or the Recursive Least Squares method.

11 Claims, 12 Drawing Sheets

Antenna 1

Antenna 2

METHOD FOR 2D ANTENNA RAKE COMBINING IN A CODE DIVISION MULTIPLE ACCESS SYSTEM

CROSS-REFERENCE TO RELATED APPLICATIONS

This application is a continuation of U.S. application Ser. No. 09/951,350, filed on Sep. 10, 2001 (now U.S. Pat. No. 7,161,974 B2), the entire disclosure of which is incorporated by reference.

FIELD OF THE INVENTION

The invention generally relates to the field of wireless signal processing. More particularly this invention relates to antenna combining and RAKE combining in a code division multiple access system

BACKGROUND

FIG. 1 illustrates the transmission scheme used in Direct Sequence Spread Spectrum communications (DSSS). A stream of data may be represented as a series of symbols, with each symbol being characterized by a symbol interval $T_s$. For example FIG. 1(a) illustrates two, square wave symbols.

Each data signal in a DSSS communication scheme is associated with a spreading sequence denoted as s(t) and shown in FIG. 1(b). A spreading sequence, s(t), is a pseudo-random noise sequence, which is unique to each data signal d(t). A spreading sequence s(t) consists of a series of rectangular pulses (or chips) of duration $T_c$ and which typically have magnitude +1 or −1, however, other magnitudes are also possible.

As is shown in FIG. 1c, a DSSS signal x(t) is the product of the data stream d(t) with the spreading sequence function s(t). This operation is a modulation in a classic sense, i.e. d(t) modulates s(t). From another point of view, the spreading sequence function is used for spreading the data sequence, which results in the spread spectrum signal x(t). The ratio of $T_s/T_c$ is called a spreading factor, which is the number of chips in one symbol period.

In Direct Sequence Spread Spectrum Code Division Multiple Access Systems (DSSS-CDMA or DS-CDMA), each user's data, for example a digitized phone call, is spread over a fixed bandwidth made available by the wireless service provider. Multiple calls are superimposed on top of each other in the frequency domain with each call assigned a unique spreading sequence defined by its code. A CDMA data stream may then be despread by a receiver, such as a mobile handset or a base-station, by reference to the spreading code assigned to the data.

A DSSS signal broadcast from a transmitter (i.e. a base-station or a handset) may reach a receiver via different paths—referred to as multipaths—due to the refraction and reflection of the signal by objects along its path. Since each multipath signal travels along a different path, each signal arrives at the receiver at a different time creating what is called a temporally diverse signal. FIG. 2 shows a temporally diverse signal model for three, hypothetical multipaths 1. $\alpha_i$ and $\tau_i$ refer to the complex magnitude and multipath delay, respectively, for the $i^{th}$ multipath (also known as the $i^{th}$ tap).

If a DSSS wireless receiver also employs multiple antennas, and each antenna is separated sufficiently apart that the signals received by the two antennas are uncorrelated, the signal components may be characterized by a space variable (referred to as spatial diversity) as well as a time variable (referred to as temporal diversity). The signal components have spatial diversity because the antennas are separated—i.e. are located at different locations in space. Spatial diversity can also be created by using antennas with different polarizations. In multi-antenna DSSS receivers, these signal components must be combined. In the art, the combination of temporally diverse signal components is referred to as RAKE combining; the combination of spatially diverse components is referred to as antenna combining.

RAKE-Combining

The structure of Direct Sequence Spread Spectrum (DSSS) communication allows a receiver to resolve multipaths and combine them. In this scheme, different multipaths are demodulated separately by so called RAKE fingers. Traditional RAKE combining is performed on a single antenna and only provides temporal diversity. Proakis, J. G., Digital Communications, McGraw-Hill, New York, 1995. This reference and all other references are hereby incorporated by reference. A typical rake finger consists of a number of correlators (despreaders) each operating on a different DSSS data signal. In some cases, as many as 4 correlators may be present each working on a different data-signal or time off-sets of the same data-signal. FIG. 3 depicts a simplified rake finger 3, comprising two correlators 5 operating on a DSSS signal comprising a pilot signal 7 and a data signal 9, each spread by its own PN sequence. The rake finger correlates the input signal with the appropriate PN sequence (this process is referred to as despreading) to generate the pilot and data symbols. The output of each rake finger is then multiplied by a combining coefficient and the resulting products are summed.

FIG. 4 shows a typical RAKE combiner and logic for combining L DSSS Pilot/Data channels 7, 9, each with an offset, or time delay of (n-$n_L$) chips and each characterized by a spreading PN sequence. In a typical first step, the pilot and data signal channels 7, 9 are despread. In a typical second step, the L RAKE fingers 3 determine L RAKE combining coefficients, $x_L$, 11, from the L DSSS pilot signals 7. In a typical third step, each of the L RAKE combining coefficients 11 are then used to weight 13 the corresponding data signal channels 9. In a typical fourth step, the RAKE combiner may then sum 15 the weighted data signals 9.

There are a number of current methods for calculating RAKE combining coefficients. The most common method for determining the combining coefficients used in conventional DSSS receivers is the maximum ratio combining method (MRC). Proakis, J. G., Digital Communications, McGraw-Hill, New York, 1995. In this method, the RAKE fingers are co-phased and scaled proportional to the signal-to-noise ratio, SNR, on each finger. In practice, the conjugate of the channel tap, also known as the multipath component estimate, is used as a measure of the SNR on each finger. An MRC combining coefficient may be expressed as:

$$W_{MRC}^k = conj(\alpha_k) \qquad \text{Equation 1}$$

Where $W^k_{MRC}$ is the coefficient of the $k^{th}$ finger and $\alpha_k$ is the $k^{th}$ multipath component (tap) of the wireless channel. The actual computation or estimation of the channel coefficients can be accomplished in a number of ways including the use of the pilot channel, or data directed approaches.

Another common method for determining the RAKE combining coefficients is the minimum mean-squares error (MMSE) method. In MMSE, the combining coefficients are optimized so as to minimize the mean of the square error. MMSE combining provides a theoretical maximum performance for a RAKE receiver. An optimized MMSE solution is shown in Equation 2. Alireza Tarighat and Babak Daneshrad, *Performance Analysis of Different Algorithms for*

CDMA2000 *Antenna Array System and a New Multi User Beamforming (MUB) Algorithm*, Proceedings of WCNC'00, Chicago, September 2000; S. Haykin, *Adaptive Filter Theory*, Prentice Hall, 1996.

$$W_{MMSE} = \xi R_{xx}^{-1} r_{xp}$$

$$R_{xx} = E(XX^t)$$

$$r_{xp} = E(Xp^*) \quad \text{Equation 2}$$

$W_{MMSE}$ is an optimized RAKE coefficient vector. X is an L-element (L is the number of fingers) vector representing the output of the pilot correlators, shown in FIG. 4, and p* represents the complex conjugate of the known pilot symbols used as the desired signal at the receiver. $R^{-1}_{xx}$ is the inverse of the autocorrelation matrix, $R_{xx}$, formed by taking the expectation value of the matrix $XX^t$. $X^t$ is the hermetian adjoint of X. $r_{xp}$ is the expectation value of the cross correlation of x with the complex conjugate of the expected pilot symbol p*. Although it is not practical to directly implement this algorithm, it does provide an upper bound on a RAKE receiver's performance for comparison purpose.

In practice, MMSE methods are rarely solved analytically, rather iterative approximations such as the method of Least Mean Squares (LMS) or the Recursive Least Squares (RLS) methods are used with LMS especially preferred because of its straightforward implementation. S. Haykin, *Adaptive Filter Theory*, Prentice Hall, 1996.

Antenna Combining

In the early days of wireless communications, antenna combining was traditionally associated with flat fading channels. A flat fading channel is one where the impulse response, h(t), of the channel is described by a single impulse with time varying amplitude and phase $\pi_{flat\text{-}fading}(t) = \alpha(t) \delta(t - \tau) e^{j\Theta(t)}$. Antenna combining can also be defined for frequency selective channels. Such channels are characterized by an impulse response, h(t), consisting of multiple impulses each with time varying amplitude and phase ($h_{freq\text{-}selective\text{-}fading}(t) = \Sigma \alpha_i(t) \delta(t - \tau_i) e^{j\Theta i(t)}$).

A number of methods exist in the art for antenna combining, including switched selection combining, equal gain combining, maximum ratio combining (MRC), and minimum mean square error (MMSE) combining. A. F. Naguib and A. Paulraj, *Recursive Adaptive Beamforming for Wireless CDMA*, Proceedings of ICC95, Seattle, pp. 1515-19; Proakis, J. G., *Digital Communications*, McGraw-Hill, New York, 1995; Alireza Tarighat and Babak Daneshrad, *Performance Analysis of Different Algorithms for cdma2000 Antenna Array System and a New Multi User Beamforming (MUB) Algorithm*, Proceedings of WCNC'00, September 2000.

When performing MRC antenna combination over a flat-fading channel, the MRC antenna combining coefficients may be expressed as $$W_{MRC} = conj(h) \quad \text{Equation 3}$$

where $W_{MRC}$ represents the MRC antenna combining coefficient and h represents the channel tap vector. conj(h) represents the complex conjugate of h. The channel tap vector is a K element vector, where K is the number of antenna channels (one tap for the channel seen on each antenna). The elements of h are complex numbers and may be determined from each antenna channel using pilot aided, decision directed, or other channel estimation techniques that are well known in the art.

When performing MMSE antenna combining over flat fading channels, the MMSE antenna combining coefficients may be expressed as:

$$W_{MMSE} = \xi R_{xx}^{-1} r_{xp} \quad \text{Equation 4}$$

where $W_{MMSE}$ represents the optimized MMSE antenna combining coefficient, $\xi$ is a scaling constant. $R^{-1}_{xx}$ is the inverse of the autocorrelation matrix, $R_{xx}$. $R_{xx}$ is formed from the expectation value of the matrix $X X^t$, where X is a K element vector containing the output of the pilot correlators, $X^t$ is the hermetian adjoint of X, and K is the number of antennas. $r_{xp}$ is the expectation value of the cross correlation of X with the complex conjugate of the expected pilot symbol p*. In addition, $W_{MMSE}$ may be determined based upon the common pilot channel using other methods well known in the art.

RAKE-Combining and Antenna Combining

Both RAKE combining and antenna combining are necessary when using multiple antennas for communication over frequency selective channels. FIGS. 5 illustrate the two, current, state-of-the-art methods for implementing RAKE combining and antenna combining in a receiver. B. H. Khalaj, A. Paulraj, T. Kailath, *Spatio-Temporal channel estimation techniques for multiple access spread spectrum systems with antenna arrays*, IEEE International Conference on Communications, Seattle, 1995; Joseph C. Liberti, and Theodore S. Rappaport, *Smart Antennas for Wireless Communications*, Prentice Hall, 1999. In FIG. 5*a*, the spatially diverse signal components associated with the different antennas are first combined via antenna combining and then the temporally diverse signal components are combined via RAKE combining. In FIG. 5*b*, the combination order is reversed with RAKE combining preceding antenna combining. Still, in either method, the combination of temporally diverse signal components is done in serial with the combination of spatially diverse signal components.

FIG. 6 shows a combined hardware/logic schematic for a typical current, state-of-the-art RAKE/Antenna combining method as applied to a dual antenna receiver and as typified in U.S. Pat. Nos. 5,809,020 and 5,812,542. In FIG. 6, each antenna 17, 19 receives 4 multipath signal components. In a first step, each multipath signal component is separated into pilot 7 and data signal 9 components by despreading the received signal by reference to the PN sequence. In a second step, the pilot components 7 from antenna 1 17 are extracted by RAKE fingers 1-4 21 and presented to the first coefficient calculation block 23. The first coefficient block 23 may calculate the first set of RAKE coefficients 24 using any of the known RAKE combining methods, such as the MMSE and MRC RAKE combining methods. The pilot components 9 from antenna 2 19 are separately extracted by RAKE fingers 5-8 25 and are presented to the second coefficient calculation block 26. The second coefficient calculation block 26 in turn produces a second set of RAKE coefficients 27. In a third step, the first set of RAKE coefficients 24 produced by the RAKE coefficient calculation block 23 of antenna 1 17 are used to scalar multiply 29*a*, 29*b* the data components 9 (i.e. $w_1 d_1 + w_2 d_2 + w_3 d_3 + w_4 d_4$) from antenna 1 17. Similarly, the second set of RAKE coefficients 27 produced by the second RAKE coefficient block 26 of antenna 2 19 are used to scalar multiply 31*a*, 31*b* the data components 9 (i.e. $w_5 d_5 + w_6 d_6 + w_7 d_7 + w_8 d_8$) from antenna 2 19. The result of summing the weighted, despread data components from each of the antennas, is two complex scalars. In a fourth step, the two complex scalars produced from step 3 are antenna combined 33 before being input to the slicer 34. Since the result of summing the RAKE weighted data components is a complex scalar, the antenna combining step may effectively treat each complex sum as a flat fading antenna channel. Step 4 may be implemented with any of the antenna combining methods detailed above.

FIG. 7 shows a combined hardware/logic schematic for a typical current, state-of-the-art RAKE/Antenna combining method as applied to a dual antenna receiver. In FIG. 7, each antenna 17, 19 receives 4 multipath signal components. In a first step, each multipath signal component is separated into pilot 7 and data signal 9 components in a despreading block 39, 41 by despreading the received signal with the appropriate PN sequence. In a second step, the pilot components 7 from antenna 1 17 are presented to a first antenna coefficient calculation block 43 and the pilot components 7 from antenna 2 19 are presented to the second antenna coefficient calculating block 45. Each antenna coefficient calculation block, 43, 45, may calculate a first and second set of antenna combining coefficients ($a_1$, $a_2$, $a_3$, $a_4$ and $a_5$, $a_6$, $a_7$, $a_8$) 44, 46, using any of the methods for antenna combining known in the art. In a third step, the first set of antenna combining coefficients 44 produced from the pilot components of antenna 1 17 are used to multiply 47 the pilot 7 and data components 9 from antenna 1 17. Similarly, the second set of antenna combining coefficients 46 produced from the pilot components of antenna 2 19 are used to multiply 47 the pilot 7 and data components 9 from antenna 2 19. In a fourth step, the pilot components 7 from each antenna are summed and the data components 9 from each antenna 17, 19 are summed 49. In a fifth step, the summed pilot components are used to produce a set of RAKE coefficients 52. In a sixth step, the RAKE coefficients 50 produced by the RAKE coefficient calculation block 50 from the two antennas 17, 19, are used to scalar multiply 51 the data components 9.

The methods according to the invention are based on the unexpected discovery that if an MMSE RAKE is performed on all the multipath components in a multi-antenna DSSS receiver, improved SNR performance may be obtained. Thus, in the preferred methods according to the invention, the RAKE combining steps and antenna combining steps illustrated in FIGS. 6 and 7 are performed in one step and in parallel.

BRIEF DESCRIPTION OF THE TABLES AND FIGURES

Figure 1:
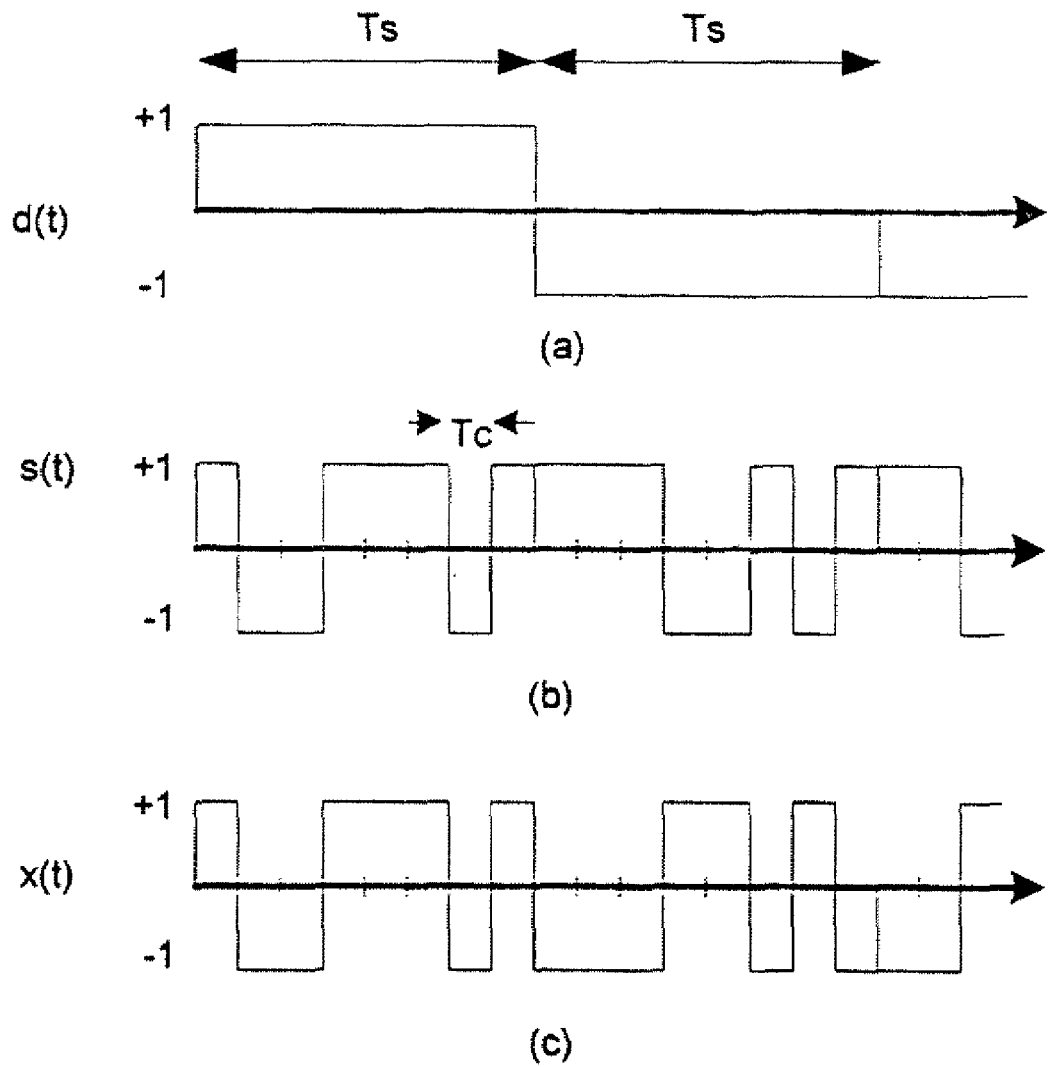
FIG. 1 illustrates a Direct Sequence Spread Spectrum signal.
Figure 2:
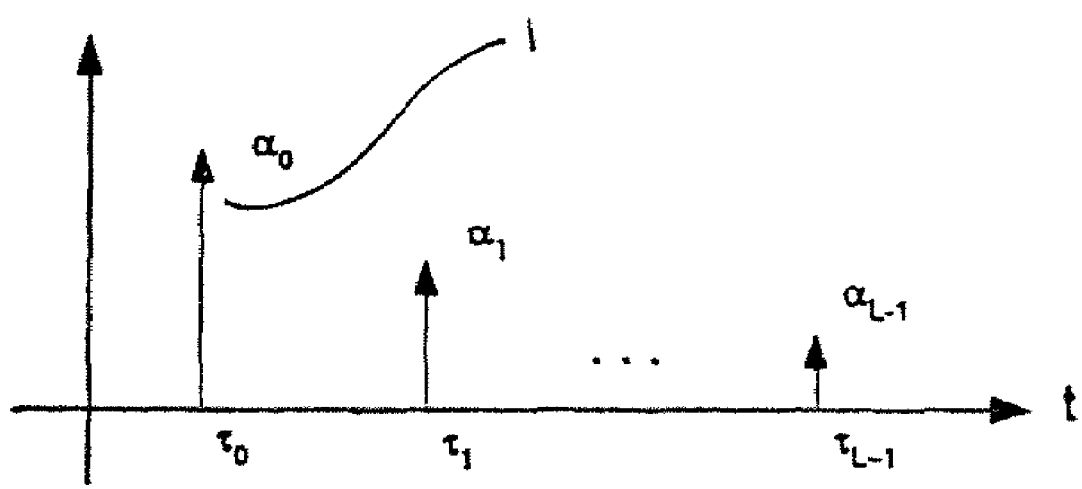
FIG. 2 illustrates a multipath, temporally diverse, channel impulse response.
Figure 3:
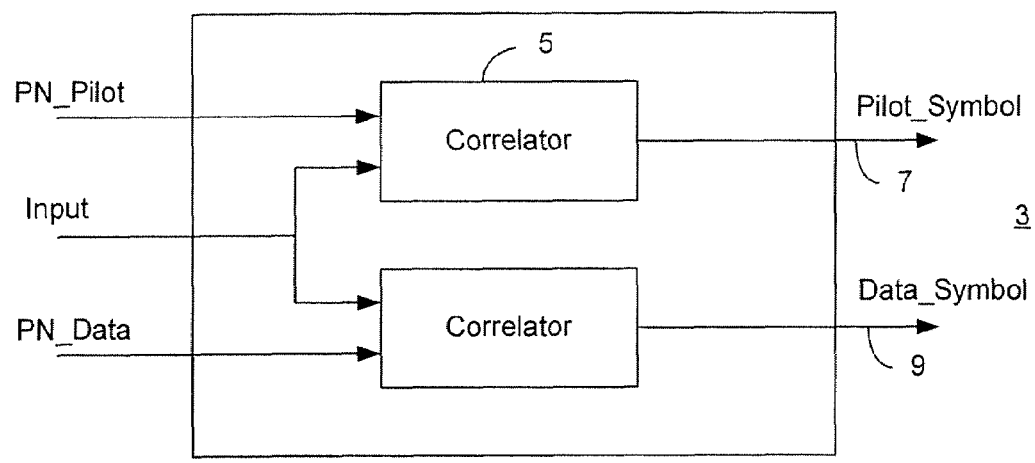
FIG. 3 shows a schematic of a typical RAKE finger for isolating data on given multipath component.
Figure 4:
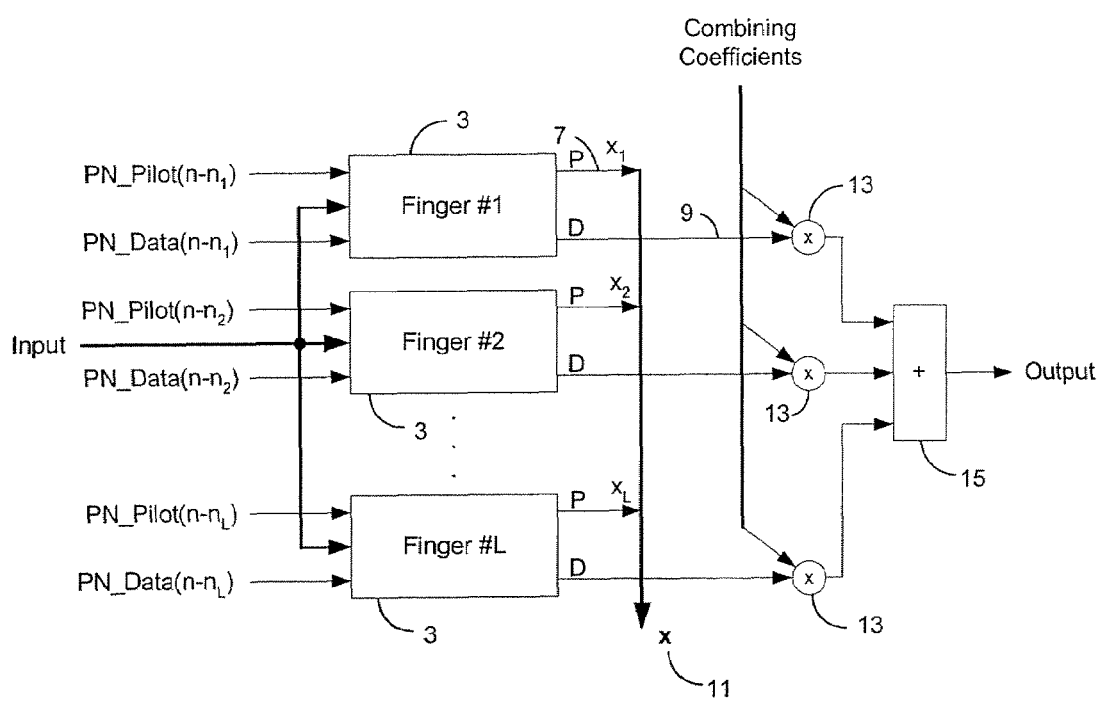
FIG. 4 shows a schematic of a typical RAKE combiner comprising L RAKE fingers for combining L RAKE channels each comprising a pilot signal and a data signal.
Figures 5A, 5B:
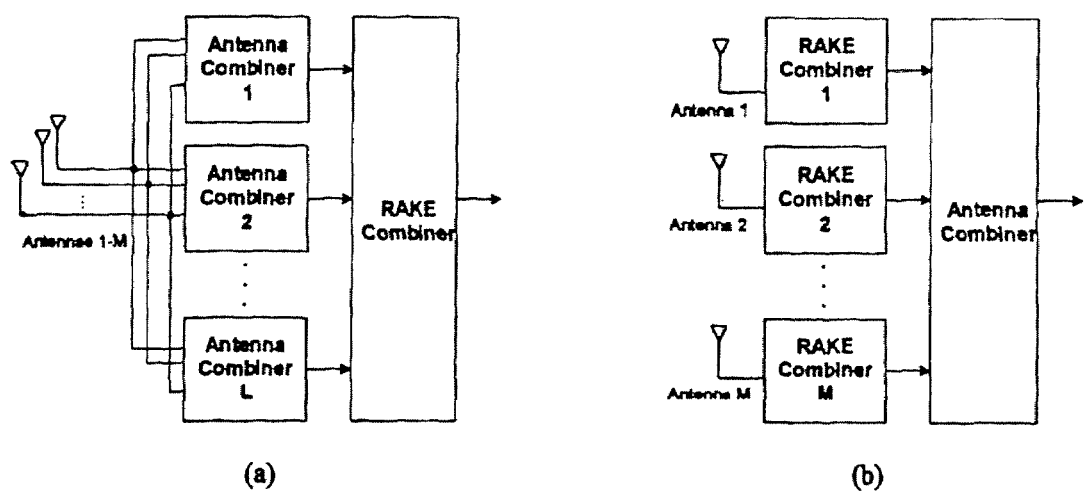

FIGS. 5(a) and 5(b) each illustrate two, current, state-of-the-methods for RAKE combining in a multi-antenna DSSS receiver.

Figure 6:
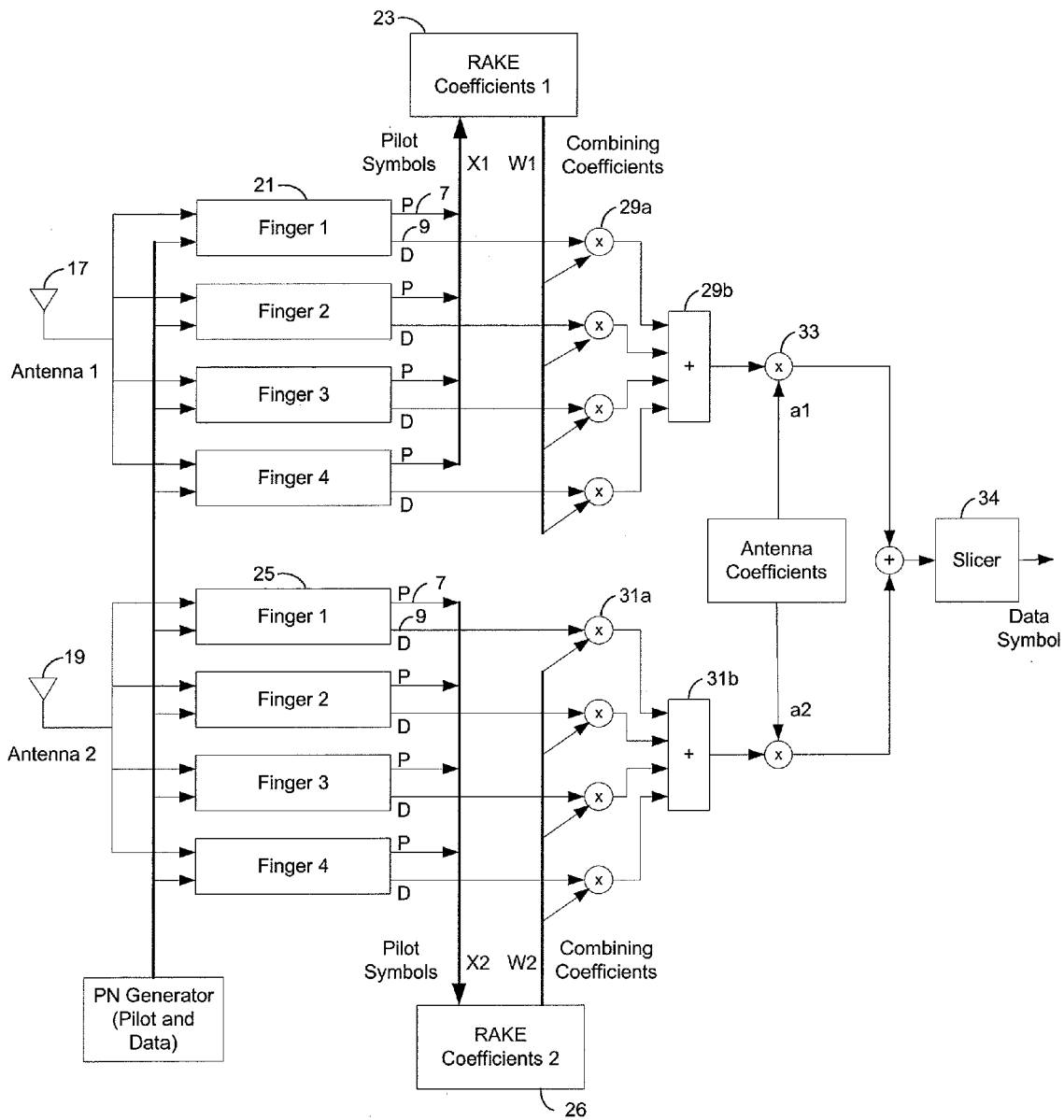

FIG. 6 illustrates a hardware/logic schematic for a typical, state-of-the-art RAKE/Antenna combining method as applied to a dual antenna mobile terminal.

Figure 7:
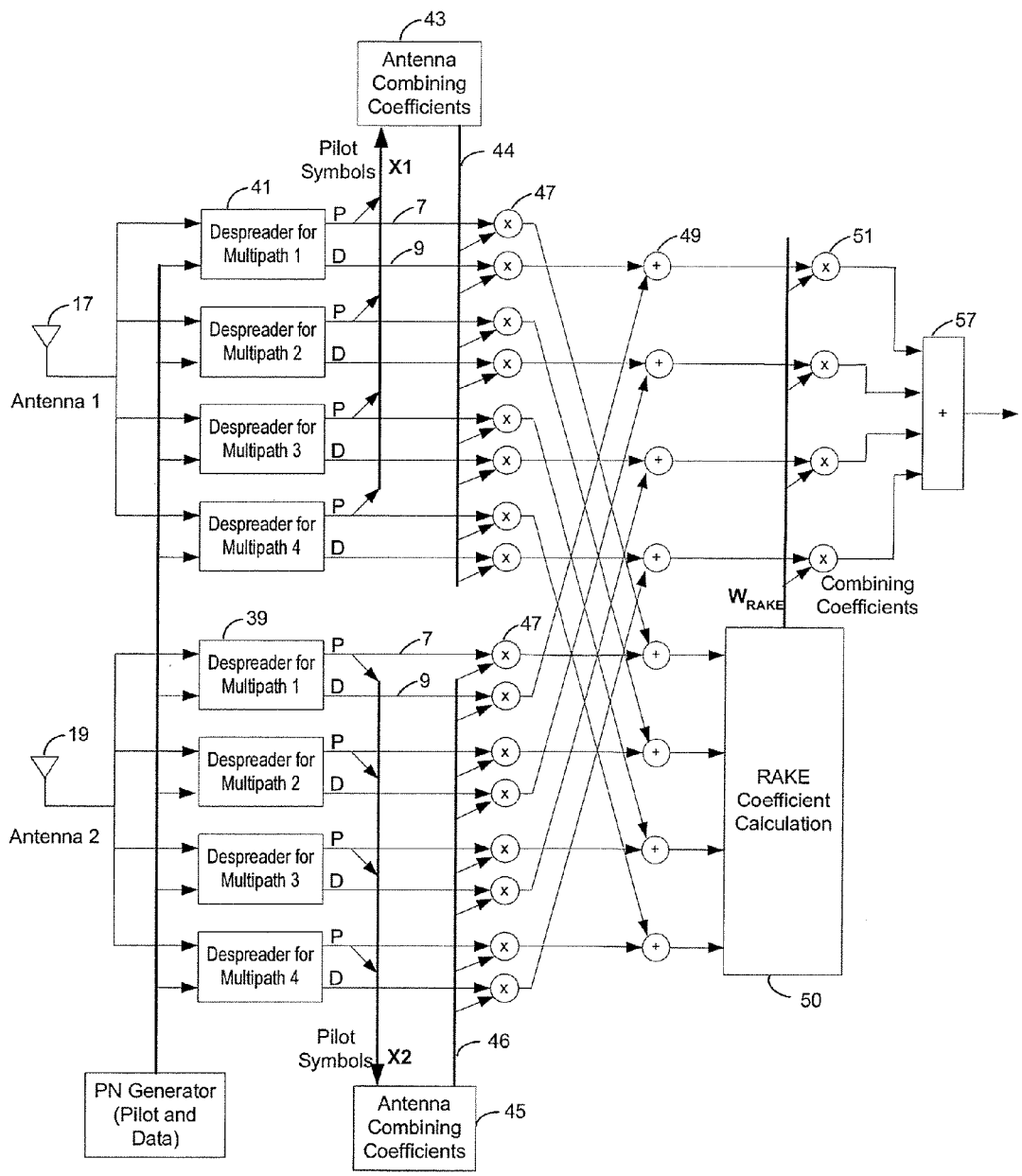

FIG. 7 illustrates a hardware/logic schematic for another typical, state-of-the-art RAKE/Antenna combining method as applied to a dual antenna mobile terminal.

Figure 8:
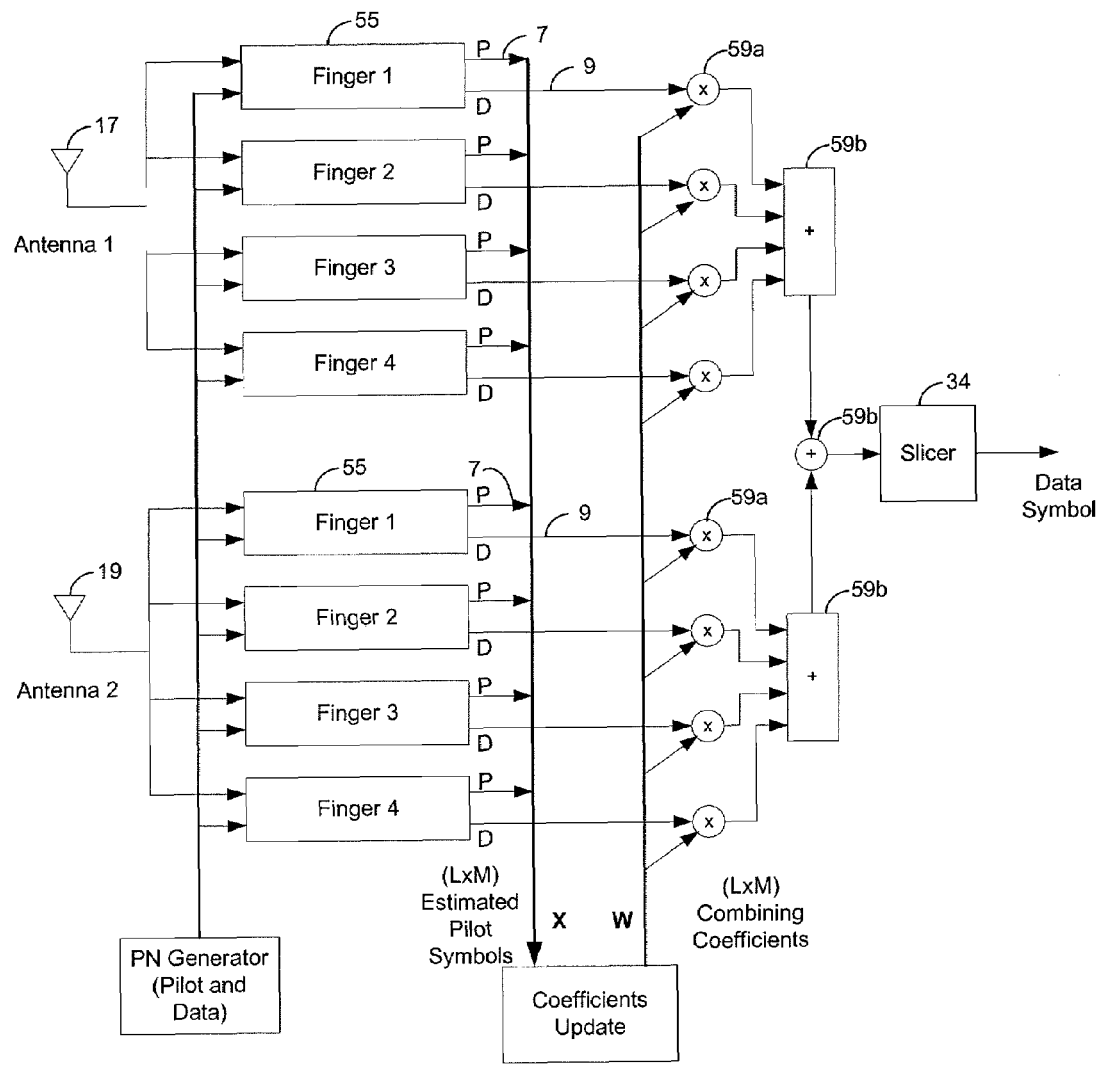

FIG. 8 illustrates a preferred hardware/logic schematic for the RAKE/Antenna combining methods according to the invention.

Figure 9:
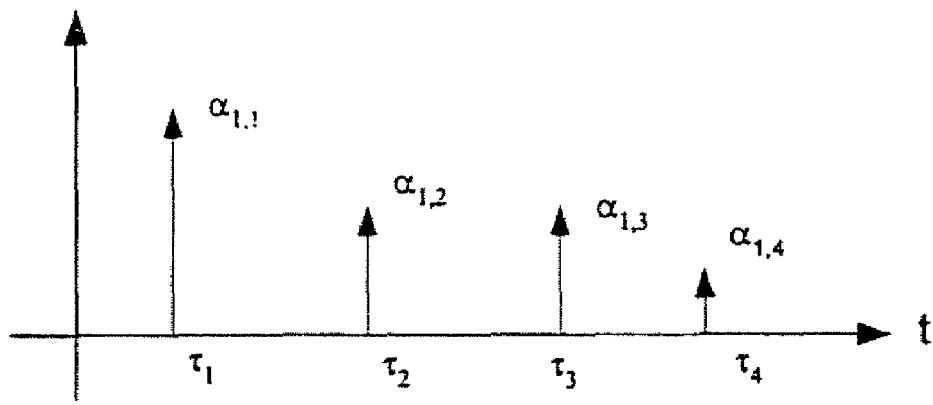
Figure 9:
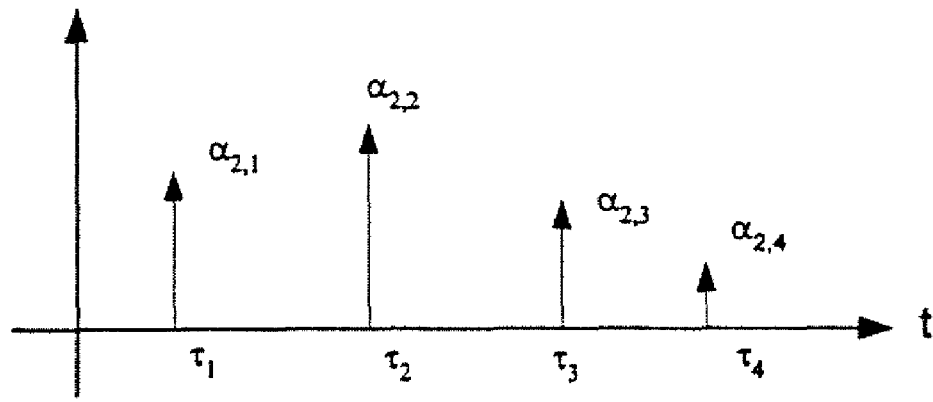

FIG. 9 shows a hypothetical multipath profile received by a DS-CDMA receiver comprising two antennas.

Figure 10:
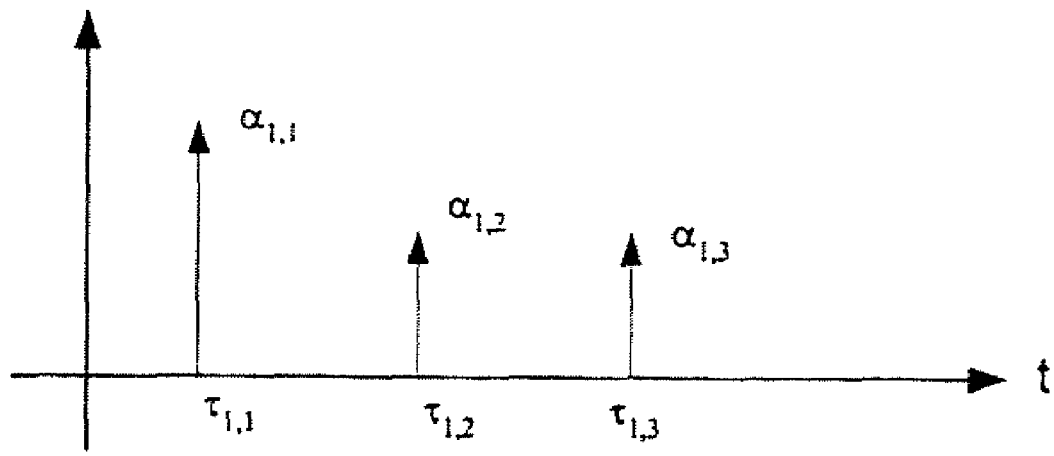
Figure 10:
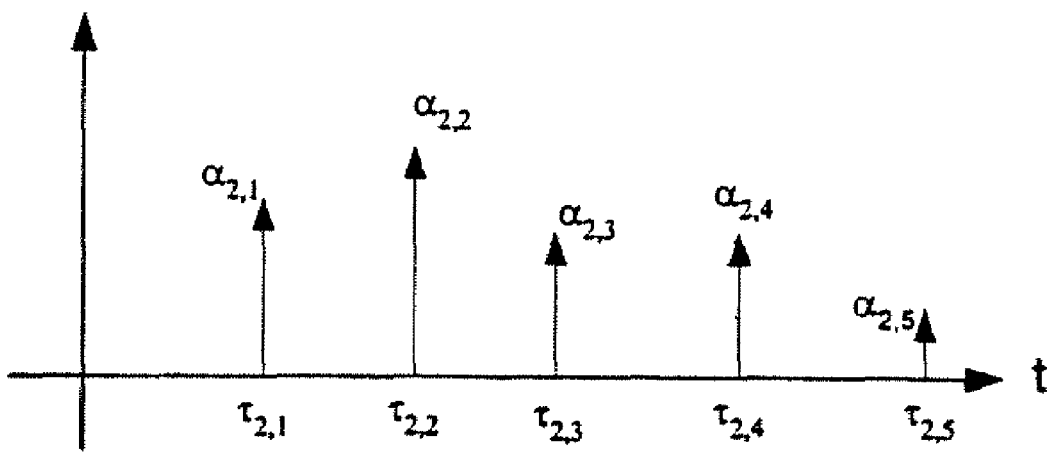

FIG. 10 shows another hypothetical multipath profile received by a DS-CDMA receiver comprising two antennas.

Figure 11:
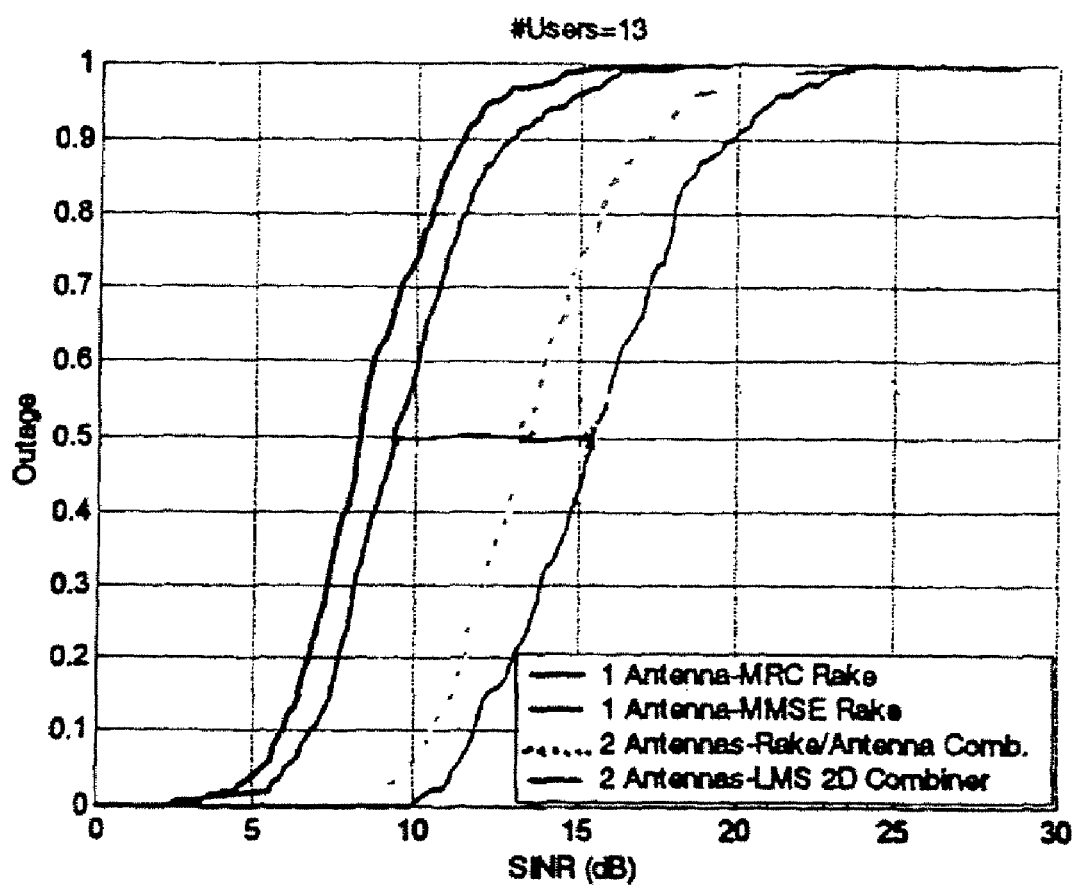

FIG. 11 shows a comparison of receiver outage as a function of SNR for current, state-of-the-art antenna/RAKE combining methods and the methods according to the invention.

Figure 12:
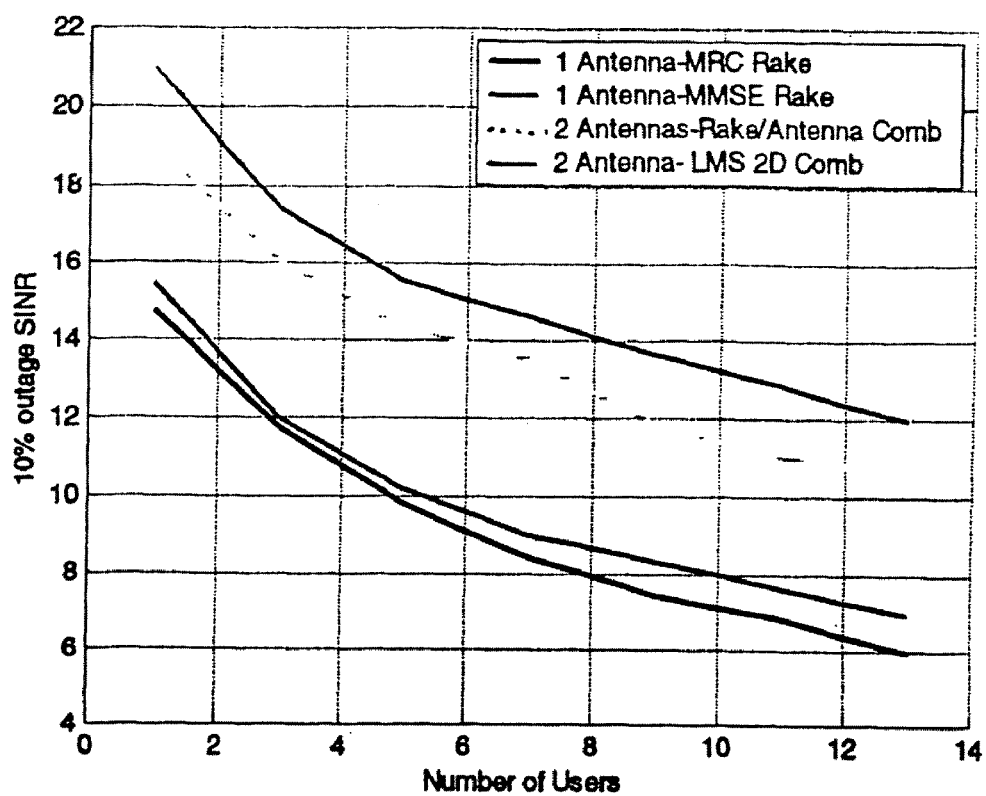

FIG. 12 shows a comparison of receiver outage as a function of the number of users for current, state-of-the-art antenna/RAKE combining methods and the methods according to the invention.

SUMMARY OF THE INVENTION

A preferred embodiment of the invention is a method for combining direct sequence spread spectrum signal components that each may be characterized by a space variable and a time variable comprising the steps of: 1) despreading the signal components; and 2) determining a set of combining coefficients from the signal components using a Minimum Mean Square Error combining method that considers the space and time variables of the signal components in parallel.

Another embodiment of the invention, is a method for combining a direct sequence spread spectrum signal comprising pilot and data signal components that each may be characterized by a space variable and a time variable comprising the steps of: 1) despreading the pilot signal and data signal components; 2) determining a set of combining coefficients from the pilot signal components using a Minimum Means Square Error combining method that considers the space and time variables of the signal components in parallel; and 3) multiplying each data signal component with its corresponding combining coefficient derived from step 2.

The Minimum Means Square Error method may be determined iteratively, using methods such as Least Means Squares, Recursive Least Squares or any other method within the set of stochastic gradient methods. Simon Haykin, *Adaptive Filter Theory*, Prentice Hall 1996

DETAILED DESCRIPTION OF THE INVENTION

A preferred embodiment of the invention is a method for combining a direct sequence spread spectrum signal comprising signal components that each may be characterized by a space variable and a time variable comprising the steps of: 1) despreading the signal components; and 2) determining a set of coefficients from the signal components using a Minimum Means Square Error combining method that considers the space and time variables of the signal components in parallel.

Another embodiment of the invention, is a method for combining a direct sequence spread spectrum signal comprising pilot and data signal components that each may be characterized by a space variable and a time variable comprising the steps of: 1) despreading the pilot signal and data signal components; 2) determining a set of combining coefficients from the pilot signal components using a Minimum Means Square Error combining method that considers the space and time variables of the pilot signal components in parallel; and 3) multiplying each data signal component with its corresponding combining coefficient derived from step 2.

Preferred Methods For Despreading Signal Components Characterized By Spatial and Temporal Variables In a preferred embodiment of the invention, signal components are despread by reference to the scrambling code provided by the PN-sequence generator. In one embodiment of the invention, a RAKE finger preferably despreads the pilot signal components and the data signal components independently. Methods of despreading DSSS signals, including the pilot and data signal components, are well known in the art. R. L. Peterson, R. E. Ziemer, D. E. Borth, *Introduction to Spread Spectrum Communications*, Prentice Hall 1995.

Preferred Methods For Determining a Set of Combining Coefficients That Consider the Spatial and Time Variables of the Signal Components in Parallel In a preferred method of the invention, a set of L DSSS signal components comprising pilot signal and data signal components that each may be characterized by a spatial variable, i, and a temporal variable, j, may be combined in parallel according to:

$$W_{2D\ MMSE} = \xi R_{xx}^{-1} r_{xp}$$

$$R_{xx} = E(XX^*)$$

$$r_{xp} = E(Xp^*) \quad \text{Equation 5}$$

$W_{2D\ MMSE}$ is an optimized 2D RAKE coefficient vector derived from performing an MMSE optimization on L DSSS signal components. W is an L length column vector, with components $w_{ij}$. A vector with "n" components shall be defined as "n" dimensional vector throughout. Thus, W is an L dimensional vector. In a wireless receiver employing antenna diversity, i would refer to a particular antenna and j would refer to a multipath component (tap) received on antenna i. Thus, when the 2D RAKE methods are applied to a multi-antenna, wireless receiver, $W_{2D\ MMSE}$ is determined from the multipath signal components in one optimization without regard to which antenna any signal component is associated with.

X is also an L dimensional column vector, with components $x_{ij}$. Each component $x_{ij}$, is preferably determined from the L pilot components using the same techniques well known in the art for performing an MMSE RAKE combination. $X^t$ is the hermetian adjoint of X.

$R_{xx}$, the autocorrelation matrix of the input data vector X, it is formed from the expectation value, $E(X X^t)$, of the product $X X^t$. $r_{xp}$ is referred to as the cross correlation of X with the complex conjugate of the expected pilot symbol $p^*$. $r_{xp}$ is formed from the expectation value $E(X p^*)$.

$W_{2D\ MMSE}$ is referred to as an optimized 2D RAKE vector because Equation 5 may be understood as performing a two dimensional RAKE combination over the L signal components, each characterized by both space and time variables, in parallel. By contrast, in typical MMSE RAKE combining, a set of multipath components which may be characterized by only one variable, time, is combined.

In a preferred embodiment of the invention, the combining coefficients represented by $w_{ij}$ are multiplied by the despread data components $d_{ij}$ and then summed to produce the output Y. If D is written in vector form as $D=[d_{ij}]^T$, this step may be represented by $Y=W \cdot D$.

An alternative method for combining the data components employs an LMS approximation of the MMSE method. In the LMS approximation of the MMSE algorithm the coefficients are obtained by an adaptive scheme where the known symbols of the pilot channel are used to generate the appropriate error signal. Once the error signal is determined, the coefficients are then updated according to the LMS algorithm which minimizes the mean of the squared error. The LMS update equation is given below.

$$e_z = p_z - W_z \cdot X_z$$

$$W_{z+1} = W_z + \mu e_z conj(X_z) \quad \text{Equation 6}$$

$p_z$, $W_z$ and $X_z$ are the known pilot data, the combining coefficient vector, and the pilot component vector at the z'th iteration respectively, and $\mu$ is the step size in the LMS algorithm.

A Comparison of the 2D RAKE Coefficients Generated By the Methods of the Invention With the Antenna-RAKE Combining Coefficients Generated By the Current, State-of-the Art Methods FIG. 8 illustrates a preferred hardware/logic for the 2D RAKE methods according to the invention. For comparison purposes with FIGS. 6 and 7, FIG. 8 considers a dual antenna diversity mobile terminal receiving 4 multipath signals on each antenna. In a first step, each multipath signal component is separated into pilot 7 and data 9 signal-components by despreading each with its corresponding PN sequence. This step is the same in both the current, state-of-the-art-methods, as shown in FIGS. 6 and 7, and the 2D RAKE methods according to the invention.

In a second step, the pilot components 7 from each antenna 17, 19 are combined in RAKE fingers 1-8 55 producing one set of, eight, 2D RAKE combining coefficients 57. One skilled in the art will appreciate-the distinction between this step and the current, state-of-the-art RAKE/Antenna combining methods. In the current methods as detailed above in FIG. 6, two sets of RAKE or antenna combining coefficients 23, 27, of four RAKE combination coefficients each, are produced for each set of antenna multipaths. In the methods detailed in FIG. 7, two sets of antenna combining coefficients 43, 45, of four antenna combining coefficients each, are produced for each set of antenna multipaths. Thus, in the current existing methods, either a RAKE combination or an antenna combination is performed separately. By contrast, in the 2D RAKE methods of the current invention, a single RAKE operation combines the signal components from both antennas simultaneously, and thus, combines in parallel, signal components characterized by space and time variables.

In a third step, the 2D RAKE combining coefficients of the current invention are used to scalar multiply 59a, 59b the data components (i.e. $w_1 d_1 + w_2 d_2 + w_3 d_3 + w_4 d_4 + w_5 d_5 + w_6 d_6 + w_7 d_7 + w_8 d_8$). This step also differs from the current, state-of-the-art methods as illustrated in FIGS. 6 and 7. In FIG. 8, the data components 9 are weighted 59a by one set of combining coefficients 57 derived from a 2D RAKE. By contrast, in FIG. 6, the data components 9 for each antenna 17, 19 are independently weighted 29a, 31a by two sets of RAKE coefficients 23, 27. The weighted data components derived from the two RAKE combinations are then antenna combined 33. Similarly, in FIG. 7, the antenna combining and RAKE combining are performed separately and independently. Thus, in current state-of-the art methods, there is no separate antenna combining step independent from a RAKE combining step according to the 2D RAKE methods illustrated in FIG. 8

EXAMPLE 1

Example 1 compares (i) the form of the combining coefficients produced from a current, state-of-the-art method where antenna combining is performed in series with MMSE RAKE combining with (ii) the form of the combining coefficients produced from the 2D RAKE methods of the current invention. The two methods in example 1 are compared for a hypothetical DS-CDMA receiver with two antennas and where each antenna receives 4 multipath pilot and data signals shown in FIG. 9. The despread pilot components may be defined as $x_{ij}$ where i refers to the antenna number and j refers to the multipath component. The despread data components may be defined as $d_{ij}$ where i refers to the antenna number and j refers to the multipath component.

In the preferred 2D RAKE methods according to the present invention, the vector form of the 2D RAKE combining coefficients may be expressed as:

$$W = R_{xx}^{-1} r_{xp}$$

$$R_{xx} = E(XX^t)$$

$$r_{xp} = E(Xp^*) \quad \text{Equation 7}$$

where W is an eight dimensional column vector $W=[w_{1,1} w_{1,2} w_{1,3} w_{1,4} w_{2,1} w_{2,2} w_{2,3} w_{2,4}]^T$. X is an eight dimensional column vector of the pilot symbols after despreading, $X=[x_{1,1} x_{1,2} x_{1,3} x_{1,4} x_{2,1} x_{2,2} x_{2,3} x_{2,4}]^T$. $X^t$ is the hermetian adjoint of X. $R_{xx}$ is the autocorrelation matrix formed from the expectation value $E(X X^t)$ of the matrix formed from the hermetian product $X X^t$. $r_{xp}$ is formed from the expectation value $E(X p^*)$ of the cross correlation of X with the complex conjugate of the pilot symbol $p^*$.

In a preferred embodiment of the invention, the combining coefficients represented by $w_{ij}$ are multiplied by the despread data components $d_{ij}$ and then summed to produce the output Y. If D is written in vector form as $D=[d_{1,1} d_{1,2} d_{1,3} d_{1,4} d_{2,1} d_{2,2} d_{2,3} d_{2,4}]^T$, this step may be represented by $Y=W \cdot D$.

In the current, state-of-the-art method, where antenna combining is performed in serial with MMSE RAKE combining, the vector form of the output Y is given by:

$$Y = (W_1 \cdot D_1) a_1 + (W_2 \cdot D_2) a_2 \quad \text{Equation 8}$$

where $$W_1 = R_{1,xx}^{-1} r_{1,xp} \quad W_2 = R_{2,xx}^{-1} r_{2,xp}$$

$$R_{1,xx} = E(X_1 X_1^t) \quad R_{2,xx} = E(X_2 X_2^t)$$

$$r_{1,xp} = E(X_1 p^*) \quad r_{2,xp} = E(X_2 p^*) \quad \text{Equation 9}$$

and where $$X_1 = [x_{1,1} x_{1,2} x_{1,3} x_{1,4}]^T \quad X_2 = [x_{2,1} x_{2,2} x_{2,3} x_{2,4}]^T$$

$$W_1 = [w_{1,1} w_{1,2} w_{1,3} w_{1,4}]^T \quad W_2 = [w_{2,1} w_{2,2} w_{2,3} w_{2,4}]^T$$

$$D_1 = [d_{1,1} d_{1,2} d_{1,3} d_{1,4}]^T \quad D_2 = [d_{2,1} d_{2,2} d_{2,3} d_{2,4}]^T \quad \text{Equation 10}$$

are the four dimesionals analogs to the corresponding vectors defined above. $a_1$ and $a_2$ represent antenna combining coefficients which may be determined by any of the means well known in the art including, equal gain combining or the MMSE methods. In the equal gain methods, all antennas are treated equally and $a_1=a_2=1$. In the MMSE antenna combining, the antennas are combined according to each of their relative SNR.

Example 1 clearly shows the difference between the 2D RAKE methods according to the invention and the current methods for RAKE/antenna combining. In the methods according to the present invention, when applied to a two antenna receiver, the combining coefficient vector W, is an (x+y) dimensional vector, where x is the number of multipath components on one antenna and y is the number of multipath components on the second antenna Inherently, because the 2D RAKE methods treat the multipath components from each of the antennas simultaneously, these methods employ vector basis sets characterized by space and time variables. Thus, the methods according to the invention, preferably derive the antenna/RAKE combining coefficients in one mathematical operation, in parallel.

By contrast in the prior art methods, the RAKE combining coefficients are determined for each antenna separately and then combined. These methods when applied to a two antenna system, where each antenna receives x and y multipath components, respectively, consists of solving two vector problems of x and y dimensionality respectively, namely, the determination of $W_1$ from $X_1$ and the determination of $W_2$ from $X_2$. In Example 1, $W_1$, $X_1$, $W_2$ and $X_2$ are all 4 dimensional vectors.

EXAMPLE 2

Example 2 illustrates that the 2D RAKE methods according to the invention preferably consider all the possible multipath component correlations in a dual antenna receiver. Example 2 also illustrates that the current, state-of-the-art MMSE-RAKE/Antenna combining methods do not consider all the possible multipath correlations in a dual antenna receiver and therefore the set of combining coefficients generated by the 2D RAKE methods are more optimal than the combining coefficients according to the current MMSE-RAKE/Antenna combining methods.

Example 2 assumes a dual antenna diversity receiver where one antenna receives three multipath signal components and the second antenna receives five multipath signal components. The channel profile considered in Example 2 is shown in FIG. 10. The despread multipath pilot signal components for antenna one may be written in vector form as $X_1=[x_{1,1} x_{1,2} x_{1,3}]^T$. The despread multipath pilot signal components for antenna two may be written in vector form as $X_2=[x_{2,1} x_{2,2} x_{2,3} x_{2,4} x_{2,5}]^T$. The cross-correlation vector for antenna one may be written as $r_{1,xp}$. The cross-correlation vector for antenna one may be written as $r_{2,xp}$. In the 2D RAKE methods according to the invention, since the signal components from both antennas are preferably combined using one RAKE combination, the multipath signal components may be written as a single vector $X=[X_1\ X_2]=[x_{1,1} x_{1,2} x_{1,3} x_{2,1} x_{2,2} x_{2,3} x_{2,4} x_{2,5}]^T$. Similarly, the cross-correlation vector may be written as $r_{xp}=[r_{1,xp}, r_{2,xp}]$. Accordingly, the 2D RAKE combining coefficients may be expressed as:

$$W = R_{xx}^{-1} r_{xp} \quad \text{Equation 11}$$

$$X = \begin{bmatrix} X_1 \\ X_2 \end{bmatrix} \quad R_{xx} = \begin{bmatrix} R_{1,1} & R_{1,2} \\ R_{2,1} & R_{2,2} \end{bmatrix} \quad r_{xp} = \begin{bmatrix} r_{1,xp} \\ r_{2,xp} \end{bmatrix}$$

where $$r_{1,xp} = E(X_1 p^*)$$
$$r_{2,xp} = E(X_2 p^*) \quad \text{Equation 12}$$

and $W=[w_{1,1}\ w_{1,2}\ w_{1,3}\ w_{2,1}\ w_{2,2}\ w_{2,3}\ w_{2,4}\ w_{2,5}]^T$.

The elements of the autocorrelation matrix $R_{xx}$ can be explicitly shown as follows:

$$R_{1,1} = \quad \text{Equation 13}$$

$$E(X_1 X_1^t) = \begin{bmatrix} E(x_{1,1} x_{1,1}^*) & E(x_{1,1} x_{1,2}^*) & E(x_{1,1} x_{1,3}^*) \\ E(x_{1,2} x_{1,1}^*) & E(x_{1,2} x_{1,2}^*) & E(x_{1,2} x_{1,3}^*) \\ E(x_{1,3} x_{1,1}^*) & E(x_{1,3} x_{1,2}^*) & E(x_{1,3} x_{1,3}^*) \end{bmatrix} = R_{1,xx}$$

$$R_{1,2} = E(X_1 X_2^t)$$

$$= \begin{bmatrix} E(x_{1,1} x_{2,1}^*) & E(x_{1,1} x_{2,2}^*) & E(x_{1,1} x_{2,3}^*) & E(x_{1,1} x_{2,4}^*) & E(x_{1,1} x_{2,5}^*) \\ E(x_{1,2} x_{2,1}^*) & E(x_{1,2} x_{2,2}^*) & E(x_{1,2} x_{2,3}^*) & E(x_{1,2} x_{2,4}^*) & E(x_{1,2} x_{2,5}^*) \\ E(x_{1,3} x_{2,1}^*) & E(x_{1,3} x_{2,2}^*) & E(x_{1,3} x_{2,3}^*) & E(x_{1,3} x_{2,4}^*) & E(x_{1,3} x_{2,5}^*) \end{bmatrix}$$

-continued $$R_{2,1} = E(X_2 X_1^t) = \begin{bmatrix} E(x_{2,1}x_{1,1}^*) & E(x_{2,1}x_{1,2}^*) & E(x_{2,1}x_{1,3}^*) \\ E(x_{2,2}x_{1,1}^*) & E(x_{2,2}x_{1,2}^*) & E(x_{2,2}x_{1,3}^*) \\ E(x_{2,3}x_{1,1}^*) & E(x_{2,3}x_{1,2}^*) & E(x_{2,3}x_{1,3}^*) \\ E(x_{2,4}x_{1,1}^*) & E(x_{2,4}x_{1,2}^*) & E(x_{2,4}x_{1,3}^*) \\ E(x_{2,5}x_{1,1}^*) & E(x_{2,5}x_{1,2}^*) & E(x_{2,5}x_{1,3}^*) \end{bmatrix}$$

$$R_{2,2} = E(X_2 X_2^t)$$

$$= \begin{bmatrix} E(x_{2,1}x_{2,1}^*) & E(x_{2,1}x_{2,2}^*) & E(x_{2,1}x_{2,3}^*) & E(x_{2,1}x_{2,4}^*) & E(x_{2,1}x_{2,5}^*) \\ E(x_{2,2}x_{2,1}^*) & E(x_{2,2}x_{2,2}^*) & E(x_{2,2}x_{2,3}^*) & E(x_{2,2}x_{2,4}^*) & E(x_{2,2}x_{2,5}^*) \\ E(x_{2,3}x_{2,1}^*) & E(x_{2,3}x_{2,2}^*) & E(x_{2,3}x_{2,3}^*) & E(x_{2,3}x_{2,4}^*) & E(x_{2,3}x_{2,5}^*) \\ E(x_{2,4}x_{2,1}^*) & E(x_{2,4}x_{2,2}^*) & E(x_{2,4}x_{2,3}^*) & E(x_{2,4}x_{2,4}^*) & E(x_{2,4}x_{2,5}^*) \\ E(x_{2,5}x_{2,1}^*) & E(x_{2,5}x_{2,2}^*) & E(x_{2,5}x_{2,3}^*) & E(x_{2,5}x_{2,4}^*) & E(x_{2,5}x_{2,5}^*) \end{bmatrix}$$

$$= R_{2,xx}$$

In the current, state-of-the-art method where antenna combining is performed in series with MMSE RAKE combining, the vector form of the combining coefficients may be expressed as $W=[a_1 W_1, a_2 W_2]^T$ where $a_1$ $a_2$ are the antenna combining coefficients and $W_1=[w_{1,1}\ w_{1,2}\ w_{1,3}]$ and $W_2=[w_{2,1}\ w_{2,2}\ w_{2,3}\ w_{2,4}\ w_{2,5}]$. The MMSE-RAKE/antenna combining coefficients may now be written as:

$$W = \begin{bmatrix} a_1 W_1 \\ a_2 W_2 \end{bmatrix} = \begin{bmatrix} a_1 R_{1,xx}^{-1} & 0 \\ 0 & a_2 R_{2,xx}^{-1} \end{bmatrix} r_{xp} \quad \text{Equation 14}$$

Comparison of Equations 11-14 immediately illustrates the difference between the current state-of-the-art methods for performing MMSE-RAKE/antenna combining versus the preferred 2D RAKE methods. The 2D RAKE methods, by way of matrices, $R_{1,2}$ and $R_{2,1}$ preferably considers all the possible signal component cross-correlations when determining an optimal set of combining coefficients W. These cross correlations between the antennas contain signal information that is lost using the current MMSE/antenna combining methods. Accordingly, the preferred 2D RAKE methods produce a more optimal set of combining coefficients than the state-of-the-art, MMSE-RAKE/antenna combining methods.

Advantages to the Preferred Methods of the Invention Relative to Current Methodologies

EXAMPLE 3

Example 3 compares SNR as a function of outage for a DSSS receiver using for the methods according to the invention and three current state-of-the-art methods. Outage may be defined as the percent of locations within the coverage area where a given SNR or other Quality of Service (QoS) can be guaranteed. The three state-of-the-methods examined are: 1) a one antenna receiver employing an MRC RAKE; 2) one antenna receiver employing an MMSE RAKE; and 3) a two antenna receiver employing an MMSE RAKE and MMSE antenna combining in serial.

Example 3 further assumes there are 13 users. The results of this experiment are summarized in FIG. 11. FIG. 11 shows that the preferred methods of the invention offer approximately two fold better SNR performance relative to the current state-of-the-art techniques where RAKE combining and antenna combining are performed in serial. Accordingly, if the preferred methods were implemented in a multi-antenna, DS-CDMA handset receiver, the preferred methods would either: 1) allow more users per cell for a given average quality of service relative to the current state-of-the-art methods or 2) allow a higher average quality of service for the same number of users relative to the current state-of-the-art methods.

EXAMPLE 4

Example 4 compares the SNR with a 10% outage for a DSSS receiver using for the methods according to the invention and three current state-of-the-art methods. 10% outage may be defined as a minimum SNR being maintained 90% of the time, as a function of users. The three state-of-the-art methods examined are: 1) a one antenna receiver employing an MRC RAKE; 2) one antenna receiver employing an MMSE RAKE; and 3) a two antenna receiver employing an MMSE RAKE and MMSE antenna combining in serial. The results of this experiment are summarized in FIG. 12. FIG. 12 shows that the preferred methods of the invention offer approximately two fold better SNR performance relative to the current state-of-the-art techniques where RAKE combining and antenna combining are performed in serial.

Although the invention has been described with reference to preferred embodiments and specific examples, it will be readily appreciated by those skilled in the art that many modifications and adaptations of the invention are possible without deviating from the spirit and scope of the invention. Thus, it is to be clearly understood that this description is made only by way of example and not as a limitation on the scope of the invention as claimed below.

What is claimed is:

1. A direct sequence spread spectrum signal receiver, comprising:
    a. a pilot spreading sequence generator;
    b. a data spreading sequence generator;
    c. a first antenna;
    d. a first plurality of RAKE fingers, the first plurality of RAKE fingers coupled to the first antenna, the pilot spreading sequence generator, and the data spreading sequence generator, the first plurality of RAKE fingers further adapted to despread a first set of multipath signal components and to generate a first multipath pilot vector and a first multipath data vector, each component of the said first set of multipath signal components having a space variable corresponding to the first antenna and a time variable corresponding to a first set of multipaths;
    e. a second antenna;
    f. a second plurality of RAKE fingers, the second plurality of RAKE fingers coupled to the second antenna, the pilot spreading sequence generator, and the data spreading sequence generator, the second plurality of RAKE fingers further adapted to despread a second set of multipath signal components and to generate a second multipath pilot vector and a second multipath data vector, each component of the said second set of multipath signal components having a space variable corresponding to the second antenna and a time variable corresponding to a second set of multipaths;
    g. a coefficient generator coupled to the first plurality of RAKE fingers and to the second plurality of RAKE fingers, the coefficient generator adapted to receive the first multipath pilot vector from the first plurality of RAKE fingers and the second multipath pilot vector from the second plurality of RAKE fingers, the coefficient generator further adapted to determine, in one step, a set of combining coefficients using a Minimum Mean Square Error combining method that considers space and time variables of each component of the first and second pilot vectors;

h. a first plurality of multipliers, each multiplier of the first plurality of multipliers coupled to a corresponding RAKE finger from the first plurality of RAKE fingers and adapted to receive a component of the first data vector from the corresponding RAKE finger, each multiplier further coupled to the coefficient generator and adapted to receive combining coefficients, each multiplier further adapted to produce an output that is a product of the the component of the first data vector and the combining coefficients;

i. a second plurality of multipliers, each multiplier of the second plurality of multipliers coupled to a corresponding RAKE finger from the second plurality of RAKE fingers and adapted to receive a component of the second data vector from the corresponding RAKE finger, each multiplier further coupled to the coefficient generator and adapted to receive combining coefficients, each multiplier further adapted to produce an output that is a product of the the component of the second data vector and the combining coefficients; and j. an adder, coupled to the first plurality of multipliers and to the second plurality of multipliers, the adder adapted to receive the output of the first plurality of multipliers and to receive the output of the second plurality of multipliers.

2. The direct sequence spread spectrum signal receiver of claim 1 wherein said Minimum Mean Squares Error combining method is implemented using an iterative method selected from a group consisting of: Least Mean Squares, Recursive Least Squares and stochastic gradient methods.

3. The receiver of claim 2 wherein said Minimum Mean Squares Error combining method is implemented using the Least Mean Squares method.

4. The receiver of claim 2 wherein said Minimum Mean Squares Error combining method is implemented using the Recursive Least Squares method.

5. The direct sequence spread spectrum signal receiver of claim 1 wherein the pilot spreading sequence generator comprises a pilot PN sequence generator and the data spreading sequence generator comprises a data PN sequence generator.

6. A method for combining a direct sequence spread spectrum signal comprising data signal and pilot signal components that each may be characterized with a space variable corresponding to receiving antennas and a time variable corresponding to multipath components, comprising:

a. despreading a first set of multipath components from a first receiving antenna of said data signal and pilot signal components into first multipath data and pilot vectors;

b. despreading a second set of multipath components from a second receiving antenna of said data signal and pilot signal components into second multipath data and pilot vectors;

c. forming an autocorrelation matrix from an expectation value of the product of said first multipath pilot vector and said second multipath pilot vector and the hermetian adjoint of said first multipath pilot vector and said second multipath pilot vector; and d. determining in one step a set of combining coefficients from said autocorrelation matrix using a Minimum Mean Square Error combining method that considers said space and time variables of the first multipath pilot vector and said second multipath pilot vector in parallel; and e. Multiplying each said first and second multipath data vectors with a corresponding said combining coefficient derived from step d.

7. The method of claim 6 wherein said Minimum Mean Squares Error combining method is implemented using an iterative method selected from a group consisting of: Least Mean Squares, Recursive Least Squares and stochastic gradient methods.

8. The method of claim 7 wherein said Minimum Mean Squares Error combining method is implemented using the Least Mean Squares method.

9. The method of claim 7 wherein said Minimum Mean Squares Error combining method is implemented using the Recursive Least Squares method.

10. The method of claim 1 wherein a number of components associated with the first multipath differs in quantity from a number of components associated with the second multipath.

11. The method of claim 6 wherein the first set of multipath components differ in quantity from the second set of multipath components.

* * * * *